(12) United States Patent
DiGiovanni et al.

(10) Patent No.: US 8,970,666 B2
(45) Date of Patent: Mar. 3, 2015

(54) LOW SCALE PRODUCTION SYSTEM AND METHOD

(75) Inventors: Jay J. DiGiovanni, Voorhees, NJ (US); Smadar Gefen, Yardley, PA (US)

(73) Assignee: Disney Enterprises, Inc., Burbank, CA (US)

(*) Notice: Subject to any disclaimer, the term of this patent is extended or adjusted under 35 U.S.C. 154(b) by 466 days.

(21) Appl. No.: 13/234,481

(22) Filed: Sep. 16, 2011

(65) Prior Publication Data
US 2013/0070047 A1 Mar. 21, 2013

(51) Int. Cl.

| | | |
|---|---|---|
| H04N 7/00 | (2011.01) |
| H04N 21/8549 | (2011.01) |
| H04N 5/222 | (2006.01) |
| H04N 21/2187 | (2011.01) |
| H04N 21/2343 | (2011.01) |
| H04N 21/2668 | (2011.01) |
| H04N 21/4728 | (2011.01) |
| H04N 21/81 | (2011.01) |
| H04H 20/38 | (2008.01) |
| H04H 60/04 | (2008.01) |
| H04H 60/07 | (2008.01) |
| H04N 5/232 | (2006.01) |
| H04N 5/247 | (2006.01) |
| H04N 5/28 | (2006.01) |
| H04N 13/00 | (2006.01) |
| H04N 13/02 | (2006.01) |
| G11B 27/034 | (2006.01) |
| G11B 27/34 | (2006.01) |

(52) U.S. Cl.
CPC ........... *H04N 21/8549* (2013.01); *H04N 5/222* (2013.01); *H04N 21/2187* (2013.01); *H04N 21/234345* (2013.01); *H04N 21/2668* (2013.01); *H04N 21/4728* (2013.01); *H04N 21/816* (2013.01); *H04H 20/38* (2013.01); *H04H 60/04* (2013.01); *H04H 60/07* (2013.01); *H04N 5/23238* (2013.01); *H04N 5/247* (2013.01); *H04N 5/28* (2013.01); *H04N 13/0059* (2013.01); *H04N 13/02* (2013.01); *G11B 27/034* (2013.01); *G11B 27/34* (2013.01)
USPC .................................. 348/36; 348/39; 700/91

(58) Field of Classification Search
USPC ............................................................ 700/91
See application file for complete search history.

(56) References Cited

U.S. PATENT DOCUMENTS 5,264,933 A * 11/1993 Rosser et al. ................. 348/578
5,491,517 A * 2/1996 Kreitman et al. ............. 348/581
(Continued)

OTHER PUBLICATIONS

Sarnoff Corporation, Pajama Channels Launches College Sports Webcast Service, 2008, 2pps., http://sarnoff.com/press-room/news/2008/01/09/pajama-channels-launches-college-sports-webcast-service.

*Primary Examiner* — Sath V Perungavoor
*Assistant Examiner* — Janese Duley
(74) *Attorney, Agent, or Firm* — Fay Kaplun & Marcin, LLP

(57) ABSTRACT

Systems and methods for low-scale and low-cost production of events. The system having a plurality of video cameras, each of the video cameras capturing a video stream, a video processing server receiving the video streams from the video cameras and generating a panoramic video stream from the video streams and a video production server selecting a region of interest based on a selection received from a user and generating a video broadcast including the region of interest, the region of interest being a portion of the panoramic video stream.

21 Claims, 5 Drawing Sheets

(56) References Cited

U.S. PATENT DOCUMENTS

| | | | | |
|---|---|---|---|---|
| 5,543,856 A | * | 8/1996 | Rosser et al. | 348/578 |
| 7,450,165 B2 | * | 11/2008 | Ahiska | 348/240.2 |
| 8,077,964 B2 | * | 12/2011 | Berestov et al. | 382/154 |
| 8,264,524 B1 | * | 9/2012 | Davey | 348/36 |
| 2009/0116732 A1 | * | 5/2009 | Zhou et al. | 382/154 |
| 2009/0284601 A1 | * | 11/2009 | Eledath et al. | 348/157 |
| 2010/0030350 A1 | * | 2/2010 | House et al. | 700/91 |
| 2010/0158099 A1 | * | 6/2010 | Kalva et al. | 375/240.01 |
| 2011/0013836 A1 | * | 1/2011 | Gefen et al. | 382/171 |
| 2011/0119708 A1 | * | 5/2011 | Lee et al. | 725/39 |
| 2013/0063549 A1 | * | 3/2013 | Schnyder et al. | 348/36 |

\* cited by examiner though the exemplary

LOW SCALE PRODUCTION SYSTEM AND METHOD

FIELD OF THE INVENTION

The exemplary embodiments relate to systems and methods for low-scale and low-cost production of events. Specifically, the exemplary embodiments are described with reference to the production of sporting events. The exemplary embodiments also relate to user controlled broadcast specifics based on the video feed from the low-scale and low-cost production of the events.

BACKGROUND

The production of a sporting event for broadcast, either on a television channel or via the Internet, can be a complicated and expensive process. Live production may require a variety of onsite personnel (e.g. producers, technicians, camera operators, etc.). Further, the onsite personnel must typically work in coordination with offsite personnel (e.g., working in a television studio) in order to overcome any technical difficulties that may arise in order to produce a finished product in real time.

Such a broadcast may also require equipment (e.g., cameras, production equipment, etc.) to be transported to the event venue. The equipment may typically be expensive, and may be susceptible to damage during transportation. Additionally, because of the cost of such equipment, a production company such as a television network may only be able to provide a full production setup at a limited number of venues at a time, since the cost and return on investment for lower tier event may not justify producing it. For example, even a relatively small event may require one to two semi-trailers worth of equipment such as sound and video processing equipment, mixers, switchers, replay devices, etc.

Full production setups, such as described above, may be available and cost-effective for production of broadcasts of professional or large college sporting events. However, there are many small college or high school events and/or non-revenue generating sporting events where there is interest in broadcasting these events to a smaller community of viewers. However, because of this smaller community of viewers, the production costs associated with the above manner of producing the event for broadcast cannot be justified.

DETAILED DESCRIPTION

Figure 1:
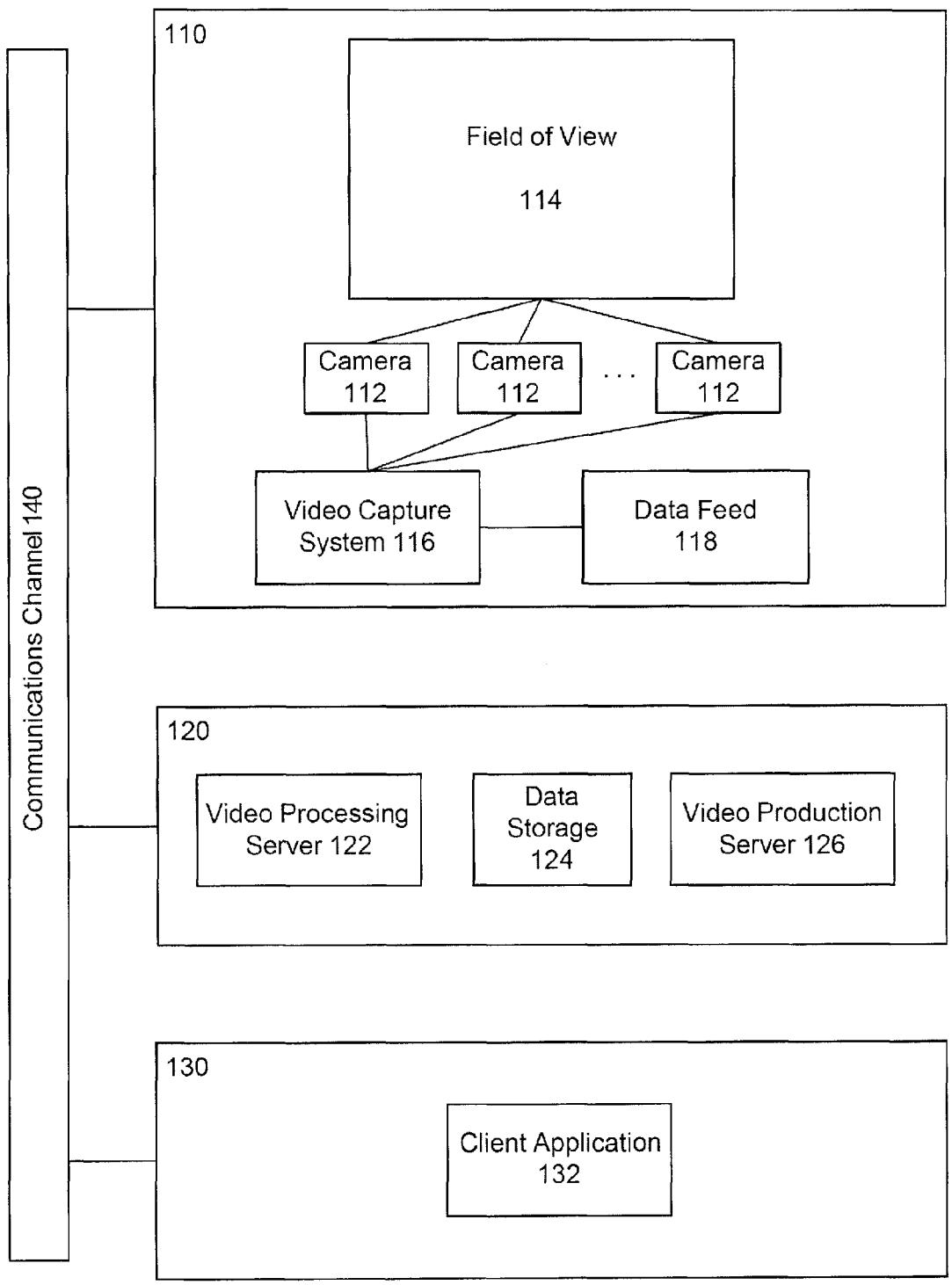
FIG. 1 shows a schematic view of a low-scale production system according to an exemplary embodiment of the present invention.

The exemplary embodiments of the present invention may be further understood with reference to the following description and the appended drawings, wherein like elements are referred to with the same reference numerals. The exemplary embodiments describe systems and methods for customized low-scale and low-cost production of sporting event broadcasts. However, those skilled in the art will understand that the below described systems and methods may be applied to other types of non-sporting events that have common characteristics with the sporting events described herein. It is also noted that the term "broadcast" as used in this application includes one-to-one, as well as one-to-many transmission of data, whether in packets, signals, or other format, and includes transmission via any mechanism of transmission, including over-the-air television, satellite television, and other wireless broadcast, cable television broadcast, cellular network, 3G, and any form of internet-based transmission. Moreover, the exemplary system may provide multiple unique "broadcasts" of the same event to multiple users.

As described above, a small-scale production system may be desirable to provide low-overhead production of sporting events that do not justify the expense of a full production staff and equipment. Such a system may be used, for example, for sporting events at high schools or small colleges, and at other locations to which it may not be feasible to transport personnel and/or equipment prior to a broadcast. Nevertheless, a small-scale production system, according to this invention, should be consistent with the production quality standard of the facilitating broadcast network.

FIG. 1 illustrates a schematic view of an exemplary low-scale production system 100 (referred to herein for brevity as "system 100"). The system 100 includes three subsystems. The first subsystem of the system 100 is an onsite capture subsystem 110, which may be installed at a venue at which sporting events to be produced for broadcast will take place. The venue may be, for example, an athletic facility at a college or high school. The onsite capture subsystem 110 includes a plurality of cameras 112, which may be permanently installed at the venue in such a manner that they cover a field of view 114 encompassing the entire field of play (e.g., an ice hockey rink, a basketball court, a baseball field, etc.) in use at sporting events to be produced for broadcast by the system 100. It will be apparent to those of skill in the art that the specific number of cameras 112 may vary depending on the type of cameras, desired image resolution, and the extent of the field of play to be encompassed by the field of view 114; for example, three cameras may be sufficient to cover an ice hockey rink or basketball court. However, the system is not limited by any particular number of cameras.

Video streams from the cameras 112 may be provided to a video capture system 116, which may typically be a combination of computer hardware and software appropriate for video processing as described herein. The video capture system 116 may serve to perform basic processing on the video streams from the video cameras 112 in order to allow the streams to be efficiently encoded (compressed) for subsequent transmission, as will be described below. In one exemplary embodiment, basic processing may include the separation of video streams into foreground and background. Since the background is static (e.g., the basketball court, football field, etc. remain constant), fewer bits per second may be used to encode and transmit its representation as compared to dynamic foregrounds. Dynamic foregrounds, due to their high motion, require relatively high bits per second to be represented with high fidelity. For example, an update for the background image may be sent at a lower frame rate than foreground regions. The frame rate in which the background may be updated typically depends on the rate in which the background image changes and is typically less frequent than foreground image change. For example, over time the indoor lighting may be changed, or if outdoors, transient clouds may shadow areas of the field. These unpredictable temporal changes affect the video image intensity and color and call for an update of the background image. However, as can be seen, by their nature such background changes are far less frequent than the changing foreground image.

U.S. Patent Publication 2011/0013836 entitled "multiple-Object Tracking and Team Identification for Game Strategy Analysis," which is expressly incorporated herein, describes systems and methods for distinguishing the foreground and background in a video stream. In the example of the '836 publication, the system generates one or more reference images of the background using a training process prior to the start of play on the background area (e.g., hockey ice, basketball court, etc.). During play, on a frame-by-frame basis, the reference image is used to subtract out those portions of the frame that are the background, thereby identifying those portions of the frame that include foreground regions.

In another exemplary embodiment, known super-resolution methods may be used to increase the resolution of the video image or the resolution of foreground regions, taking advantage of vibrations or auxiliary overlapping cameras. Those of skill in the art will understand that the above examples of foreground and background separation are only exemplary and that any method for identifying the foreground and background in the frame may be used with the exemplary embodiments.

The onsite capture subsystem 110 may also include a data feed 118 that may be coupled to the video capture system 116 to bundle data received by the data feed 118 with processed video output by the video capture system 116 for subsequent transmission. Data received by the data feed 118 may be, for example, calibration related data, scoreboard data, game clock data, audio data, graphics for insertion, or any other type of data that may be useful to supplement the video data provided by the cameras 112 in the production of the broadcast of the sporting event. While the data feed 118 is shown as a single separate component, this is only for illustration purposes. For example, a first data feed 118 may be an Ethernet cable that is connected from a scoreboard controller to the video capture system 116 that provides data from the scoreboard controller such as home team score, visitor score, game period, time remaining, etc. In another embodiment, the data feed 118 may be data that is derived from the video feed itself within the video capture system. Examples include video recognition of home and visitor score using known video number recognition algorithms, identification of players based on video recognition algorithms, etc. A further example of a data feed may be that the production company hires a local person (e.g., a student) to input certain types of event information via, for example, a smartphone that is wirelessly sent to the video capture system 116.

In another embodiment, the venue where the event takes place or any third party may send via the data feed 118, or any other channel of communication, graphics (including advertising or any other information) to be over-laid (posted) or in-laid (inserted) into the final produced broadcast by the production server 126. Moreover, a venue related source or any other party may also deliver commercial segments that may be integrated into the final broadcast, possibly, using the game-clock as a trigger. According to this exemplary embodiment, this feature facilitates one means for targeted advertising that is tied with a certain venue or event. Another means for targeted advertising is tied to the user, where the video production server 126 inserts graphics into the final broadcast based on the user's production rules and preferences, as will be explained below in detail. The above examples are not exhaustive and are provided to show that the data feed 118 may be any manner of providing event data to the video capture system 116. This data may be referred to herein as event metadata and will be transmitted with the video data by the video capture system to a studio subsystem 120 as will be described in greater detail below.

The elements of the onsite capture subsystem 110 may be installed in locations that are appropriate to avoid deliberate or inadvertent contact by athletes, spectators, media, or any other individuals in the venue. Such placement may enable the onsite capture subsystem 110 to be calibrated once, at the time of installation, with a minimized likelihood that the equipment will be disturbed and calibration will need to be repeated.

Calibration of each camera 112 may include determining the camera's parameters (referred to herein as camera model) such as position, rotation, pan, tilt, and focal length. The camera model is typically determined based on 1) known venue's 3D model and 2) analysis of the video and/or sensory data (measured by sensors attached to the camera that capture, for example, its rotation, pan, and tilt). The calibration process, then, may be carried out by the video capture system 116 or by the video processing server 122. The video processing server 122 may maintain, for each venue, information related to the site physical characteristics—venue's 3D model. This information will be accessible for the camera calibration process when calibrating the system for future events in the same venue. Thus, camera models may be determined once for a specific venue, may be adjusted at the beginning of each game, and, if necessary, may be refined dynamically to compensate for possible camera motion during the event.

The system 100 may also include a studio subsystem 120. The studio subsystem 120 may be disposed remotely from the onsite capture subsystem 110, such as at a production facility of a television network producing sporting events for broadcast. The studio subsystem 120 includes a video processing server 122, which, like the video capture system 116, may typically be a combination of computer hardware and software appropriate for video processing as described herein. The video processing server 122 may perform further processing on the video streams providing additional event metadata to the one that may be already provided by the onsite capture subsystem 110. A first exemplary function performed by the video processing server 122 may be to stitch the plurality of video streams provided by the cameras 112 into a single panoramic video stream encompassing the entire field of view 114. The stitching may be accomplished by techniques that are known in the art. In another embodiment, stitching may be performed by the video capture system 116.

A second exemplary function performed by the video processing server 122 may be to detect and track moving objects within the field of view 114. Objects to be tracked may include players, officials, a ball or puck, etc. A third exemplary function may be to identify teams and/or individual players being tracked. Exemplary systems and methods for tracking and identification are described in the above incorporated U.S. Patent Application Publication 2011/0013836, titled "Multiple-Object Tracking and Team Identification For Game Strategy Analysis."

A fourth exemplary function performed by the video processing server 122 may be to detect events occurring within the field of view 114. Events may be, for example, shots taken in a basketball game, goals scored in a hockey game, pitches in a baseball game, etc. Those of skill in the art will understand that data related to these detected events may subsequently be used to enhance a broadcast created from the video streams, such as by zooming in a view on events as they occur or by providing live statistics on the basis of the events. For example, using known in the art pattern recognition methods, a shot event may be detected in a basketball game. Similarly, in a football game, through human pose and formation analysis, the beginning of each play as the players aligned by the scrimmage line may be detected. Extracting statistical data based on detection of game events is described in detail in patent application Ser. No. 12/490,026 titled "System and Method for Analyzing Data from Athletic Events", which is hereby incorporated by reference in its entirety.

A fifth exemplary function may be to insert graphics into the video. Graphics may include embedded advertising or game enhancements such as a first down line ("FDL") in a football game. The graphics may be requested by a user who accesses the video, or by a third party (e.g., an advertiser). Systems for inserting electronic images into live video signals, such as described in U.S. Pat. Nos. 5,264,933 and 5,543,856 to Rosser, et al. and U.S. Pat. No. 5,491,517 to Kreitman et al., which are hereby incorporated by reference in their entirety, have been developed and used commercially for the purpose of inserting advertising and other indicia into video sequences, including live broadcasts of sporting events. These systems, though, primarily insert graphics into video from a dynamic camera (e.g. the broadcast camera), while in this exemplary embodiment, the insertion will be employed into a static panoramic video of the game and may be a function of the viewer's selected production rules and preferences (targeted advertising) as will be explained in detail below.

It is noted that various exemplary functions have been described above for the video processing server 122. Those skilled in the art will understand that these are not the only functions that may be performed by the video processing server 122, but are only described to provide examples of the type of processing of the video feed that may be performed by the video processing server 122. In addition, some exemplary manners of performing these functionalities (e.g., player tracking, event based information extraction, game enhancement, indicia/graphic insertion, etc) have been described, but similarly, the exemplary embodiments are not limited to these specific manners of implementing these functionalities. Any manner of performing these functionalities may be used in the exemplary embodiments.

The studio subsystem 120 also includes data storage unit 124. The data storage unit 124 may be any suitable storage system, as are well known in the art. The data storage unit 124 buffers or stores video that has been processed by the video processing server 122, along with any other associated event metadata, as described above, for further processing or future access by the video production server 126, respectively. Thus, users of the system 100 may view an event live or may access data (video and its associated metadata) stored in the data storage unit 124 to view the event at a later time.

The studio subsystem 120 also includes a video production server 126 that interfaces with a user to produce a customized broadcast of a sporting event from the processed video generated by the video processing server 122 in a manner that will be described in further detail below.

The third subsystem of the system 100 is a production subsystem 130, which may serve to enable a user to cut a program from video stored at the data storage 124 of the studio subsystem 120, or, in another embodiment, of a currently-occurring event that is being streamed to the studio subsystem 120. The production subsystem 130 may be disposed remotely from the onsite capture subsystem 110 and the studio subsystem 120, such as at a customer's or end user's premises, or may be collocated with the studio subsystem 120. For example, the end user may be an individual viewer that is viewing the sporting event on, for example, their Internet equipped television or home computer. In another example, the end user is a director or producer at the studio of the network that is broadcasting the event. In such a case, the end user will create the broadcast that then may be transmitted to multiple viewers.

The production subsystem 130 includes a client application 132, which may be a software application including a user interface running on appropriate computer hardware. The client application 132 has access to the panoramic view of the event being produced, each available video stream, as well as all associated event metadata (e.g., clock data provided by the data feed 118, player tracking data generated by the video processing server 122, etc.) that may be available. As described above, the "user" of the production subsystem 130 may be a professional producer (e.g., an employee of a television network that may broadcast the finished program) or may be an end user producing a broadcast for personal use. The client application 132 may present, to the user, options for video production as will be discussed in further detail below. Subsequently, the client application 132 may also present a finished broadcast, which will be produced as described below.

The onsite capture subsystem 110, the studio subsystem 120 and the production subsystem 130 are linked to one another via a communication channel 140. The communication channel 140 may be a secured link using the Internet (e.g., a VPN), an unsecured link using the Internet, a dedicated communication link, or any other communication channel capable of conveying data described herein (e.g. any combination of cables, satellite, cellular, and Wi-Fi communication links). In one embodiment, there may be a first communication channel linking the onsite capture subsystem 110 with the studio subsystem 120 and a second communication channel linking the studio subsystem 120 and the production subsystem 130, rather than a single communication channel linking all three subsystems 110-130.

Figure 2:
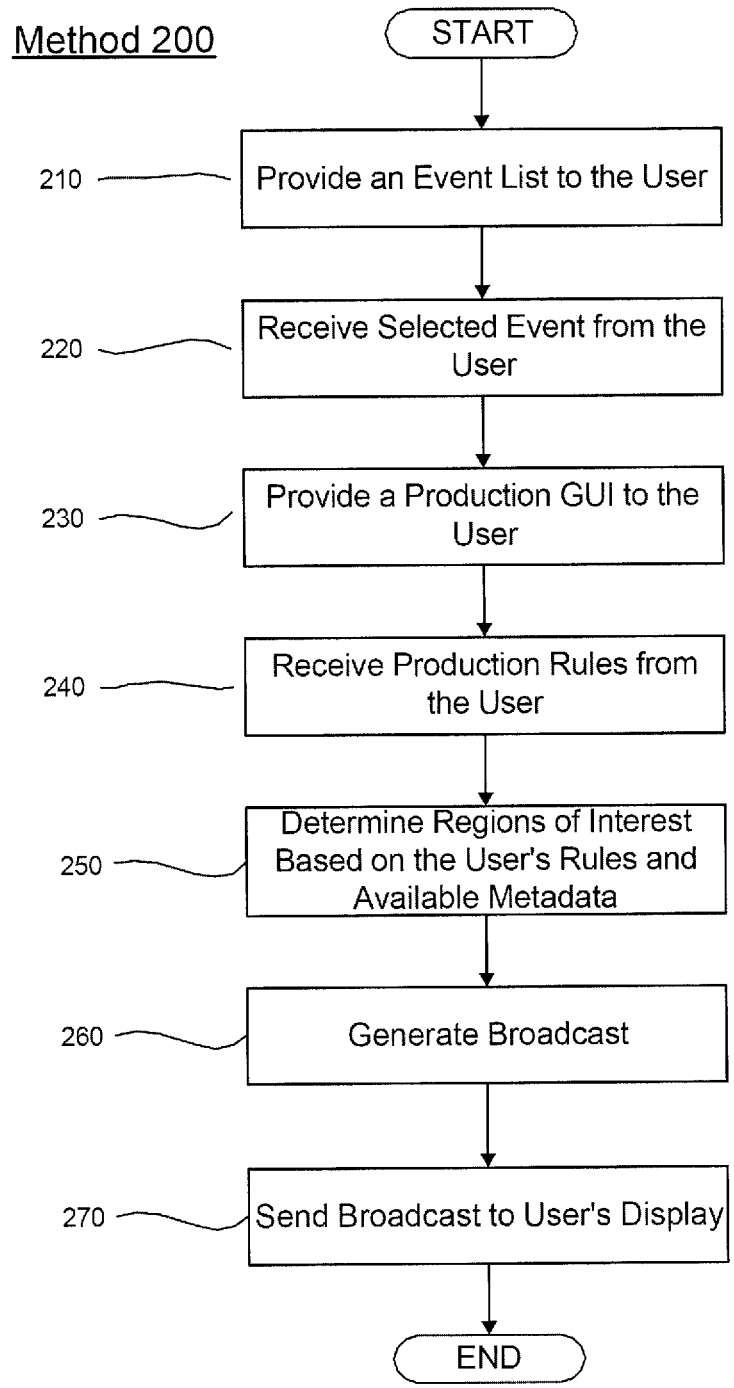
FIG. 2 shows a low-scale production method according to an exemplary embodiment of the present invention.
Figure 4:
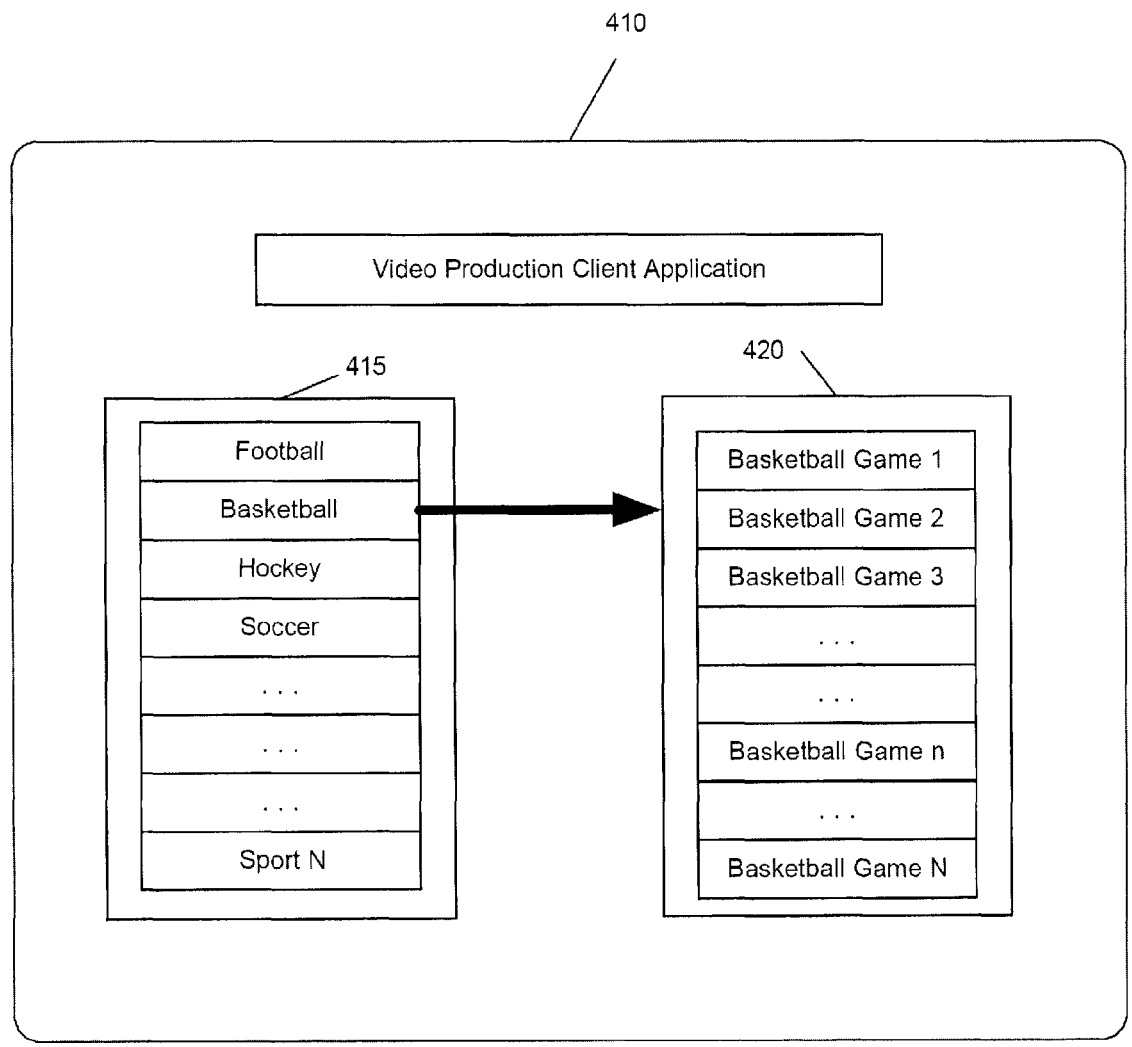
FIG. 4 shows an exemplary embodiment of an event selection graphical user interface.
Figure 5:
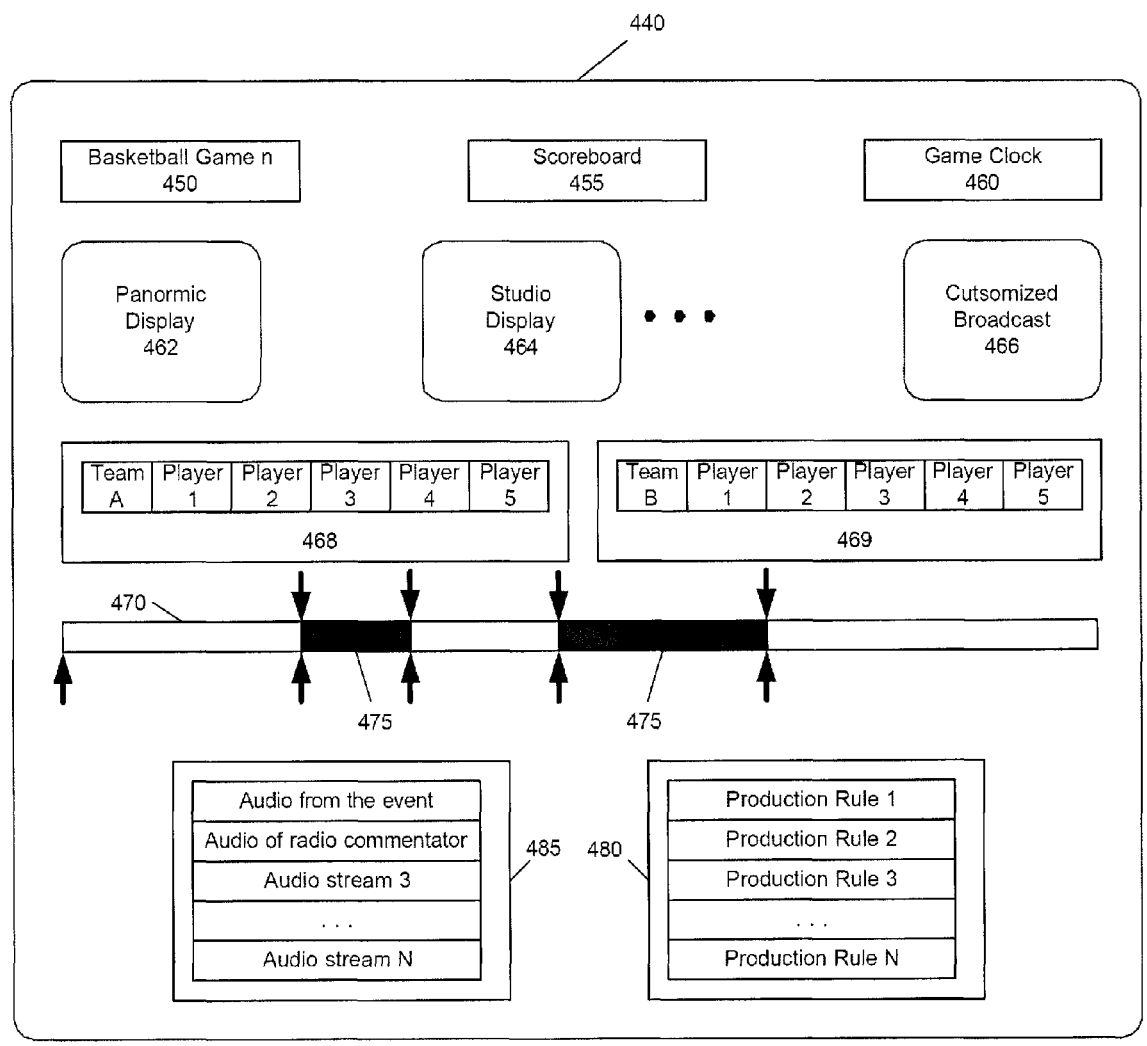
FIG. 5 shows an exemplary embodiment of a production graphical user interface.

FIG. 2 shows an exemplary method 200 by which a user may produce a customized broadcast. The method 200 will be described with reference to the elements of the system 100 of FIG. 1 and the exemplary client application 132 graphical user interfaces (GUIs) 410 and 440 of FIGS. 4 and 5, respectively. Upon invoking the client application 132, the video production server 126 presents the user, in step 210, with a list of available games, for example, as shown by event selection GUI 410. This list may contain events that took place in the past, as well as, live or future events. As illustrated in FIG. 4, the user may select a desired event for which a list of available games will be presented (e.g., the user has highlighted "basketball" in the event list 415 and a game list 420 showing a list of selectable basketball games appears to the user). Next, in step 220, the user may proceed selecting a specific event (e.g., Basketball Game n from game list 420). In response to receiving this request, the video production server 126 sends back a production GUI 440 to the user in step 230. An exemplary production GUI 440 is illustrated in FIG. 5. The appearance of the production GUI may be a function of the selected game and the available metadata associated with it. The production GUI 440, for example, may include a presentation of the scoreboard 455 and the game-clock 460. Several video displays may be presented including the panoramic view 462 (generated by the video processing server 122), a view of an analyst providing game commentary 464, the customized broadcast as produced by the user 466, and any other available video stream.

As described above, the video production server 126 may send the production GUI 440 to the user. However, in an alternative embodiment, templates for the production GUI 440 may be stored in the client application 132 and based on the information (e.g., metadata) sent from the video production server 126, the client application 132 may populate the correct template with the information from the video production server to display the production GUI 440 to the user.

The production GUI 440 may also include a set of options and rules that the user may select from to customize the production of the broadcast. The parameters presented may depend on the available event metadata associated with the broadcast; for example, where team identification or individual player positioning data is available, the user may be presented with the option to select a team or an individual player for the broadcast to focus on. For example, a list with names or possibly pictures of the teams and players 468, 469 may be presented. In this example, a user may select a preferred team and/or player and this selection will be used as a production rule 480 or parameter by the video production server 126 as will be explained in further detail below.

In step 240, the video production server 126 receives the user's selected production rules via the communication channel 140. These production rules may be set by the user once before the event and/or be updated during the event (or during the streaming of the game from the server to the client). In step 250, the video production server 126 "cuts the program" by selecting a region of interest ("ROI") of a certain size and location within the panoramic view generated by the video processing server 122 and creates a customized view of the event within the panoramic view. The ROI is defined by the production rules received from the user in step 240. For example, if the user selected a team participating in the sporting event, the ROI may be sized and positioned to include all members of the team currently active in the sporting event; if the user selected an individual player, the ROI may be sized and positioned to show the individual player and his or her immediate surroundings. On the other hand, if the user selected a rule 480 stating that the broadcast coverage should be tightly close to include all players in the game, the ROI may be decreased (zoomed-in view) as players group together and may be increased (zoomed-out view) as players spread out. Those skilled in the art will understand that there are any number of production rules that may be used to determine a particular ROI.

As the sporting event progresses, the ROI may be translated within the panoramic view based on the selection or selections made by the user, such as to keep a selected player centered within the ROI; those of skill in the art will understand that translation in this manner simulates a camera panning. The ROI may also be resized within the panoramic view, and correspondingly up-converted or down-converted to fit within a constant display size 466 (e.g., a window on the user's display); those of skill in the art will understand that resizing in this manner simulates a camera zooming in or out.

As shown in FIG. 5 the production GUI 440 may also include a time bar 470 indicating the progression of the game. During the viewing of the currently produced game, the viewer may indicate highlight segments 475 to be later embedded or indexed into the generated broadcast 260. These, highlights, based on a rule 480 selected by the user, may be cut into the broadcast during game breaks.

In another embodiment, the user may manually control the size and position of the ROI, possibly relative to the panoramic display 462. In such an embodiment, the user may change the size of the ROI by, for example, a keyboard command, a mouse input, a pinch-and-zoom using a touch screen display, or any of the other various window resizing methods known in the art. Similarly, the ROI can be repositioned using methods such as a keyboard command, a mouse input, a touch-and-drag using a touchscreen display, etc. In another embodiment, during part or all the event coverage, the user may select in step 240 to view the panoramic view 462, in which case the ROI may simply include the full panoramic view.

In step 260, the produced broadcast is finalized by the video production server 126. This may include adding audio track to the video generated in step 260; audio to be added may be ambient sound from the sporting event, background music, color commentary, user's selected audio stream, etc. In one embodiment, the user may be able to select the desired audio 485 from a plurality of options such as those listed above. For example, while small college and high school sporting events are generally not televised because of the related cost, it is very typical for these events to be broadcast on the radio or streamed via internet. Thus, one of the data feeds 118 may be the radio broadcast of the event, or alternatively the in-venue audio from the event. The user may then be able to select the radio broadcast as the audio that is played with the video broadcast.

Standard production devices at the venue (e.g., video capture system 116) or at the studio (e.g., video production server 126) may be used to encode the video signal and the corresponding audio signal into one stream. Where these video and audio signals are both streamed live no synchronization is required, while in a case where, for example, the audio is a pre-recorded signal (e.g. background music selected by the user), the production server 126 may synchronize the audio track to the video based on the production rules provided by the user and via appropriate interface featured by the client application 132. In a further example, where the video signal is delayed for any reason, e.g., to insert enhanced graphics, etc., the audio stream may be delayed by the production server 126 for the same amount of time as the video delay. The amount of video delay may be determined based on the user's selection of video enhancements for the broadcast. The production server 126 may be programmed to determine the video delay based on these selections and apply the same delay to the audio stream.

Step 260 may also include adding graphics to the video within the ROI determined in step 250. This may include advertising graphics, a scoreboard and/or game clock, a production company logo, and/or any other graphics appropriate for addition to a video production of a sporting event. Audio and/or graphics added to the video in this step may be added at the request of the user or of a third party. Moreover, the production server 126 may use the user's production rules and preferences, received in step 240, to alter the insertion into the produced video in step 260. Meaning, the type of graphics and the manner of insertion may be a function of the viewer's profile. The viewer's profile, in turn, may be built based on the viewer's provided data and selections made via the client application 132.

In one exemplary embodiment, the final video broadcast may be converted into a pair of stereoscopic video streams utilizing known in the art methods. For example, U.S. patent application Ser. No. 13/229,048 entitled "system and methods for converting video", which is expressly incorporated herein, discloses a method for converting 2D video into 3D video exploiting a panoramic video generated based on the 2D video input. Otherwise, if the cameras used are stereoscopic cameras, an embodiment of this invention may be employed to each stereoscopic stream, where the region of interest determined by the user is applied to each stream, thus, cutting a stereoscopic pair for the final video broadcast.

In step 270, the produced video is provided to the user. This may mean that the produced video is transmitted to the user as a live stream, as a compressed or uncompressed data file, stored (e.g., using data storage unit 124) for the user's subsequent retrieval, or provided in any other manner for the provision of video content known in the art.

The exemplary method of FIG. 2 describes the receipt of a single selection or set of selections from a user. However, those of skill in the art will understand that the user may change the selection or selections during the course of a broadcast (e.g., a user who has selected an individual player may change the selection to a general view of the game after the selected individual player leaves the game), and that the broadcast may change correspondingly during the course of the sporting event. In another exemplary embodiment, the client application 132 may provide the user with the option to select multiple views, with each view having its own selection or selections as described above, and with a separate ROI being defined for each view as described above. In another embodiment, there may be multiple users, each accessing a corresponding client application 132, and each user may define his or her own individualized set of selections and have an individualized broadcast generated by the video production server 126, as described above. In yet another embodiment, a video production server 126 may serve multiple client applications, driven by multiple users, to produce one customized broadcast of an event, where the server combines the selections of these users and possibly resolves conflicting selections based on assigned users' priorities.

Figure 3:
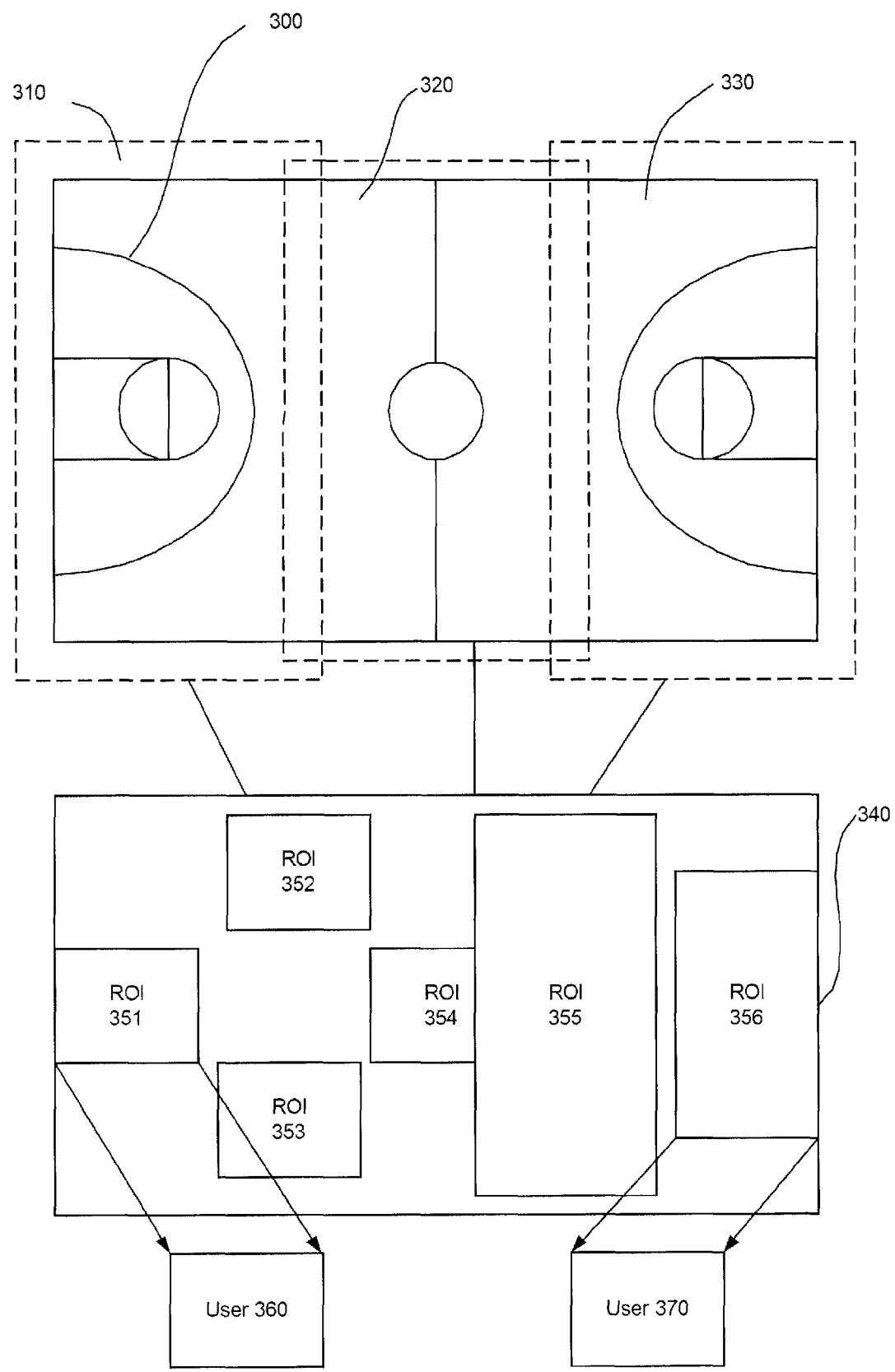
FIG. 3 shows an exemplary representation of an event site and the video streams from the event according to an exemplary embodiment.

FIG. 3 shows an exemplary representation of an event site 300 and the video streams 310-330 from the event. In this exemplary embodiment, the event site 300 is a basketball court. Also, in this example, there will be three cameras used to capture the event. The first camera provides the field of view 310, the second camera provides the field of view 320 and the third camera provides the field of view 330. In this exemplary embodiment, it is shown that the filed of views 310-330 overlap in certain areas and are slightly larger than the even site 300. This is only exemplary and such an arrangement is not a requirement of the exemplary embodiments.

As described above, the video streams showing the field of views 310-330 from the three cameras may be stitched together (either by the video processing server 122 or the video capture system 116) to create the panoramic view 340 of the event site 300. Within the panoramic view 340, there are multiple regions of interests (ROI) 351-356 defined based on users' selections. The manner of defining these regions of interests has been described in detail above. In this embodiment, two user's 360 and 370 have been illustrated. The first user 360 has selected parameters that defined ROI 351 and the video processing server 122 is streaming the video of this ROI 351 to the user 360. In contrast, the second user 370 has selected parameters that defined ROI 356 and the video processing server 122 is streaming the video of this ROI 356 to the user 370.

Thus, the exemplary embodiments may provide a content producer with the ability to install cameras at venues, and subsequently provide broadcasts of events from those venues without transporting further equipment or personnel to the venues. Broadcasts may be produced by the content producer and provided to viewers via television broadcast or the Internet. Alternately, a client application may be provided to one or more end users, such as via a web browser or dedicated software application, and the end users may then be able to use the client application produce customized broadcasts. Broadcasts may be produced for live streaming during an event, may be produced during the event for subsequent retrieval, or may be produced after the event using archived video data.

It is noted that the above-described exemplary embodiments may result in several different business/revenue models for various participants in a sporting event. For example, as described extensively above, an individual user may make individual selections to produce their own show for personal viewing. In another example, a user may make the selections using a computing device, but has the ability to route the cut program to the user's television for viewing by friends and family. In a further example, a user may make the selections using a computing device as described above, but then may re-broadcast the cut program via the internet and allow other users to stream it. This would allow users to become "amateur producers." These amateur producers could develop a reputation for quality and build a name for themselves and have more people tune in to their shows. These amateur producers may be allowed to charge for their cut program or receive a portion of ad revenue depending on how many viewers they get. The amateur producers may even add their own content to the cut program such as color commentary.

In another example of a revenue source, the school may pay whoever installs the system and supplies the software for the product, including possibly a monthly subscription. This would benefit the school with alumni contact, building a fan base, etc. Another source of revenue is for the user to pay to receive the camera streams. Another source of revenue, as mentioned above, is for the end viewer to pay the user to receive the user's cut (and possibly commentated) broadcast. Conversely, the supplier of the equipment may choose to cover the cost of installed equipment for the schools or venues in return for the right to utilize the video/audio content produced by the equipment.

Finally, advertising could be used to generate revenue throughout the system. This could be from virtually inserted ads (e.g., logo on the basketball court), "pop-up" or overlay ads appearing in/over the video stream, inserted commercials (videos) breaking away from the camera feeds, ads could also be placed in the user interface, such as pop-ups, side bar ads, or an extra "camera feed" window could be included that just showed ads. In the model where the user was re-broadcasting his cut program, the software could require that the user insert a certain number of video ads during the game.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. The hardware platform may also be a standard video processing platform and its associated hardware and software components. In a further example, the exemplary embodiments may be implemented via a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A system, comprising:
   a plurality of video cameras, each of the video cameras capturing a video stream;
   a video processing server receiving the video streams from the video cameras and generating a panoramic video stream from the video streams; and
   a video production server defining a region of interest based on a selection of production rules received from a viewer and generating a video broadcast including the region of interest, the region of interest being a portion of the panoramic video stream.

2. The system of claim 1, wherein the video cameras are fixed to provide overlapping fields of view encompassing a venue.

3. The system of claim 1, wherein the video production server converts the video broadcast into a pair of stereoscopic video broadcast streams.

4. The system of claim 1, wherein at least one of the cameras is a stereoscopic camera capturing a pair of stereoscopic video streams and the video production server generates a stereoscopic video broadcast including the region of interest.

5. The system of claim 1, further comprising:
   a data feed receiving event data relating to an event being captured by the plurality of the video cameras,
   wherein the video production server uses a portion of the event data when generating the video broadcast.

6. The system of claim 5, wherein the event data comprises one of audio data, a score, and a game clock.

7. The system of claim 1, further comprising:
   a data storage unit storing one of the video streams, event data relating to an event being captured and the selection received from the viewer, wherein the data storage unit makes available to one of the viewer and a further viewer the one of the video streams, event data relating to the event being captured and the selection received from the viewer.

8. The system of claim 7, wherein the data storage unit is configured to store information identifying a highlight segment of the video streams based on a highlight selection of the viewer received by the video production server.

9. The system of claim 1, wherein the video production server receives a further selection from the viewer during the video broadcast, and wherein the video production server defines a further region of interest based on the further selection.

10. The system of claim 1, wherein the video production server adds additional content to the region of interest while generating the video broadcast.

11. The system of claim 10, wherein the additional content is one of audio content and visual content.

12. The system of claim 10, wherein the additional content is selected based on viewer specific information including a further viewer selection.

13. The system of claim 1, further comprising:
    a video capture system receiving the video streams from the video cameras, wherein the video capture system compresses the video streams prior to transmitting the video streams to the video processing server.

14. The system of claim 1, wherein the video production server is disposed remotely from the plurality of video cameras.

15. A non-transitory computer-readable storage medium storing a set of instructions executable by a processor, the set of instructions, when executed by the processor, causing the processor to perform operations comprising:
    receiving a plurality of video streams;
    merging the video streams to form a panoramic video stream;
    receiving, from a viewer, a selection of production rules relating to video production preferences;
    defining a region of interest of the panoramic video stream on the basis of the selection of production rules received from the viewer;
    generating a video broadcast including the region of interest; and
    providing the video broadcast to the viewer.

16. The non-transitory computer-readable storage medium of claim 15, wherein the operations further comprise:
    receiving, from a further viewer, a further selection of production rules relating to video production preferences;
    defining a further region of interest of the panoramic video stream on the basis of the further selection of production rules received from the further viewer;
    generating a further video broadcast including the further region of interest; and
    providing the further video broadcast to the further viewer.

17. The non-transitory computer-readable storage medium of claim 15, wherein the operations further comprise:
    receiving, from the viewer, a further selection of production rules; and
    defining a further region of interest of the panoramic video stream on the basis of the further selection of production rules received from the viewer,
    wherein the video broadcast includes the region of interest and the further region of interest.

18. The non-transitory computer-readable storage medium of claim 17, wherein the video broadcast simultaneously includes the region of interest and the further region of interest.

19. The non-transitory computer-readable storage medium of claim 15, wherein the operations further comprise:
    transmitting, to the viewer, an indication of a plurality of events to be displayed to the viewer; and
    receiving a selection of one of the events from the viewer, wherein the plurality of video streams are for the selected one of the events.

20. The non-transitory computer-readable storage medium of claim 15, wherein the selection relating to the video production preferences is based on one or more production rules selectable by the viewer.

21. A non-transitory computer-readable storage medium storing a set of instructions executable by a processor, the set of instructions, when executed by the processor, causing the processor to perform operations comprising:
    receiving, from a viewer, a selection of production rules relating to a panoramic video stream, wherein the panoramic video stream is created from a plurality of video streams;
    defining a region of interest of the panoramic video stream on the basis of the selection of production rules received from the viewer;
    generating a video broadcast including the region of interest; and
    providing the video broadcast to the viewer.

* * * * *